United States Patent Office 3,252,721
Patented May 24, 1966

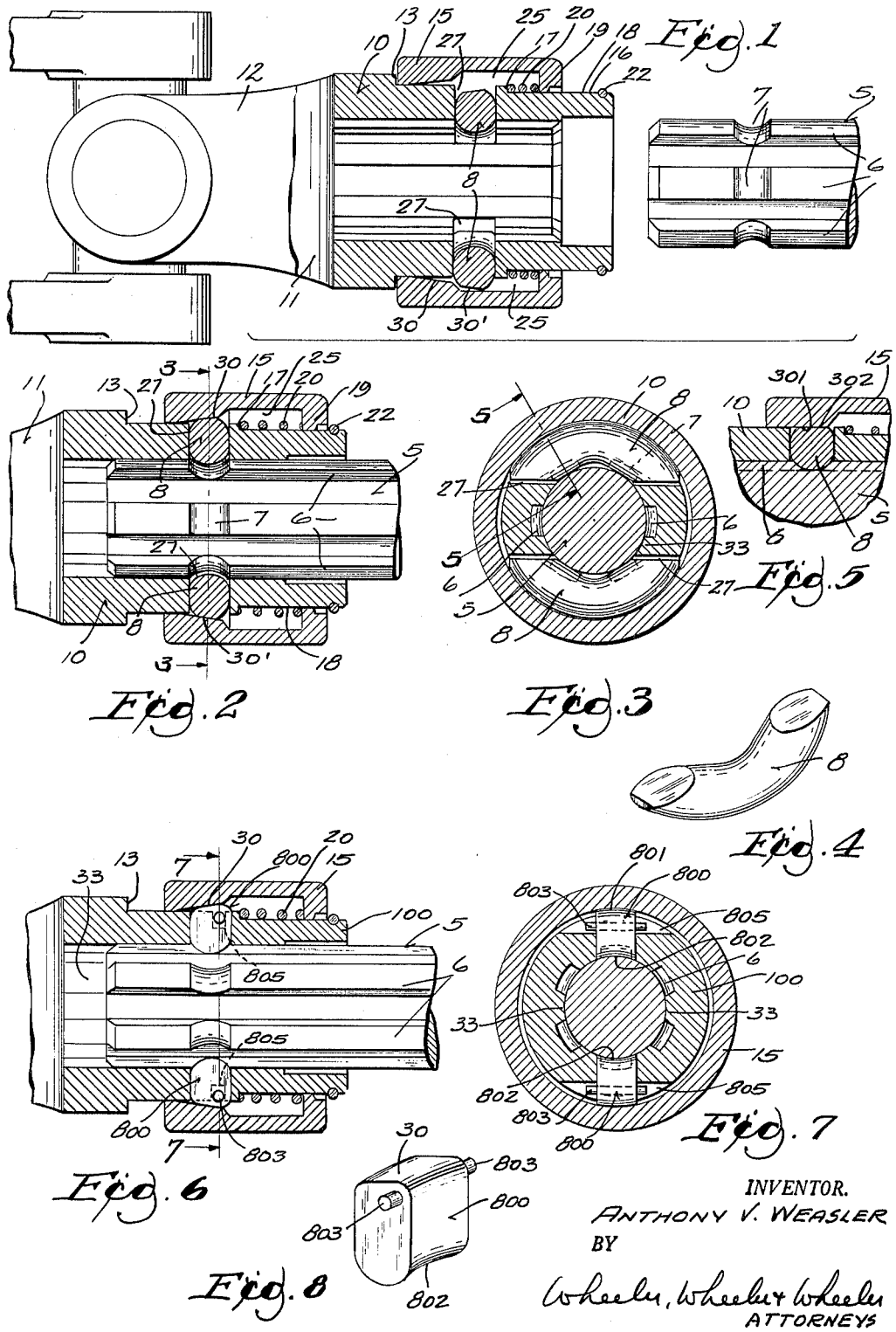

3,252,721
SLIDE LOCK FOR RELEASABLY CONNECTING
SHAFT ELEMENTS
Anthony V. Weasler, 603 Ridge Road, West Bend, Wis.
Filed Mar. 21, 1963, Ser. No. 266,888
4 Claims. (Cl. 287—119)

This invention relates to a slide lock for releasably connecting shaft elements.

As disclosed, the elements connected by the slide lock are the elements of a universally jointed and telescopically extensible shaft. The connected shaft elements are splined in the present exemplification and axially separable when released. In this embodiment, the object of the invention is to facilitate the connection and disconnection of such elements without tools.

This is done by providing the outer element with a lock sleeve having limited reciprocation axially of the element upon which it is mounted and having an internal cavity capable of receiving the slide or slides used to lock the elements together. In one position of the sleeve, the cavity registers with the slide and the displacement of the slide into the cavity permits the inner element to be withdrawn. In another position of the sleeve, to which it is urged by the bias of a spring housed within it, the sleeve holds the slide in a position in which it enters into a pocket in the other element to lock the inner element against withdrawal from the outer element.

In the drawings:

FIG. 1 is a view showing in separated positions the inner element and the outer element, portions of the outer element being shown in section.

FIG. 2 is a view similar to FIG. 1 showing the elements in their assembled relationship, portions of the outer element being shown in section.

FIG. 3 is a view taken in cross section on the line 3—3 of FIG. 2.

FIG. 4 is a detail view in perspective showing the arcuate slide used in FIGS. 1 to 3.

FIG. 5 is a fragmentary detail view in a section shown at 5—5 in FIG. 3 but showing a modified embodiment of the invention.

FIG. 6 is a view similar to FIG. 2 showing a further modified embodiment of the invention.

FIG. 7 is a view taken in section on line 7—7 of FIG. 6.

FIG. 8 is a view in perspective of the lock slide used in FIGS. 6 and 7.

In all embodiments selected to exemplify the invention, the inner element and outer element have complementary configuration of any desired non-circular form here referred to as splines. Thus, the inner element 5 is provided with axial splines at 6, intersected by peripheral channels 7 to receive the lock slides hereinafter to be described. The channels may be of any desired section but desirably have the slides 8 fitted snugly therein.

The slide 8 shown in FIGS. 1 to 4 is arcuate as to its general form, having an extent sufficient to engage concurrently in the peripheral channels 7 of consecutive splines 6 as clearly appears in FIG. 3.

In the disclosed embodiment, the outer element 10 comprises the hub of a yoke generically designated by reference character 11 which may be bifurcated to provide the arms 12 of a universal joint, other parts of which are not here illustrated, being irrelevant to the present invention. Externally, the hub 10 is desirably shouldered at 13 to provide an abutment for a sleeve 15 which slides on the generally cylindrical surface 16 to the right of the shoulder as viewed in FIGS. 1 and 2. By limiting the movement of sleeve 15, the shoulder prevents excessive compression of spring 20. Another shoulder is provided at 17 of the hub and beyond this to the right as viewed in FIGS. 1 and 2 is a bearing surface 18 for the flange 19 of the sleeve 15. The compression spring 20 housed within sleeve 15 seats at one end against the shoulder 17 and at its other end against the flange 19. Its bias urges sleeve 15 toward the position illustrated in FIG. 2. The split ring 22 is detachably applied to the outer member 10 and serves as a retainer to secure the sleeve 15 against loss from the outer member.

The outer element 10 has recesses at 27 for the slides 8. When the slides are seated in the channels 7 of the inner element 5 of the coupling, and are confined in such channels by the first bearing surface 30 of sleeve 15, the inner and outer elements of the coupling are securely locked against separation. While the surface engaged by the slide may be parallel to the axis as shown in FIG. 5, nevertheless when substantial torque is being handled, it is preferred that the bearing surface 30 of the lock sleeve 15 be frusto-conically beveled as clearly appears in FIGS. 1 and 2. Complementary bevels 30' may be provided on the slides 8 as shown. By means of the bevel, the slides are so wedged into the channels 7 that the inner and outer elements are coupled as rigidly as if they were made of one piece. FIG. 5 shows the surfaces 301 and 302 parallel to the axis.

If the operator desires to withdraw the inner element 5 from the outer element 10 (the hub of yoke 11) he has only to push the slide lock sleeve 15 axially to the left as viewed in FIG. 2, whereupon the cavity 25 of sleeve 15 will register with the slides 8. The increased radius of cavity 25 accommodates portions of the slides which are normally confined within recesses 27. Thus, by pulling on the shaft 5, the slides can be cammed radially into the cavity 25 as shown in FIG. 1, being expelled from the channels 7 of the inner element 5, and leaving the inner element free for axial movement. In FIG. 1, the inner element has been completely withdrawn and the slides are left in the positions to which they are urged by gravity.

When the inner element 5 is restored to its normal position, the slides 8 are readily cammed outwardly by the end of the shaft or inner element, provided the slide sleeve 15 is in the position shown in FIG. 1. When the slides are returned to the channels 7 of the inner element by release of the sleeve 15, the parts are again locked as shown in FIG. 2 and FIG. 3.

In the construction shown in FIGS. 6 to 8, the slides 800 have the general shape of the letter T in elevation. There is a head portion 801 which is arcuate in transverse section as shown in FIG. 7. While it may be parallel to the axis as in FIG. 5, it, along with surface 30, is preferably beveled as shown in FIG. 6. The radially innermost end portion 802 of each slide is saddle-shaped as shown in FIG. 8 to fit the peripheral channels 7 formed in the splines.

Instead of making the projecting ends of the head portion integral with the center of the head portion, as might be normal procedure, it is preferred to use a cross pin 803 the ends of which serve as overhanging shoulders for engaging complementary shoulders 805 of the outer element 100. These shoulders keep the slides from falling into the central bore of element 100 when the inner element 5 has been removed as shown in FIG. 1. The cross pin 803 is desirably off center, particularly when the slide and the lock sleeve are beveled as shown, the objective being to permit the slide to be assembled only in the correct position.

In all of these devices, the operation is the same.

Instead of using the locking slides 8 or 80 or 800 to constrain the inner and outer elements to rotate as one, it is preferred, in practice, that the inner and outer elements respectively have splines 6 and 33 which are complementary to assure rotation and the only function of the slides 8 or 80 or 800 is to secure the parts against axial separation until the locking members are released by pushing lock sleeve 15 in opposition to the biasing spring. The construction shown in FIGS. 7 to 9 is preferred over the others because it is easier to make with precision than the form of slide shown in FIG. 4 and by reason of accurate fit in the cross channels of the splines it distributes the stress to prevent the splines from becoming peened by endwise reciprocation.

I claim:

1. In a coupling, the combination of an outer element having an annular wall with outer and inner peripheral bearing surfaces and having peripherally spaced circumferential slots adapted to receive and confine locking slides, said wall having splines extending axially of its inner bearing surface, an inner element telescopically receivable into the outer element and having an external bearing surface provided with splines complementary to those of the outer element and encircled by an annular concavely bottomed channel intersecting its said splines in registry with said slots in the assembled position of said elements, locking slides in said slots and movable into and from said channels and having surfaces of substantial area complementary to the channel bottom, said slides locking said elements against axial separation when the slides are engaged in the channel, the concave form of the bottom of the channel being adapted under axial pressure of the inner element to force the slides radially outwardly to positions for release of the inner element except when the slides are held against radial outward movement, slide confining means comprising a sleeve mounted for axial reciprocation on the outer peripheral bearing surface of the outer element and having a wedging slide-engaging inner surface at one end and a spring seat at the other and an intermediate slide-receiving cavity adapted to accommodate outward movement of the slides when registered therewith by axial movement of the sleeve in a slide-releasing direction, a spring engaged with the spring seat of the slide and acting thereon in a direction to bias the slide toward slide confining engagement of its wedging surface with respective slides, the outer coupling element having a seat for said spring and having stop means for limiting the movement of said sleeve responsive to spring bias.

2. In a coupling, the combination of an outer element having an annular wall with outer and inner peripheral bearing portions and having a portion adapted to receive and confine a T-shaped locking slide, said locking slide receiving portion including a substantially radially extending slot in said outer element annular wall and a transverse shelf like portion on each side of said slot to receive the shoulders of said T-shaped slide member to thereby prevent said slide member from becoming disengaged from said slot on withdrawal of an inner element, a locking slide in the said portion and exceeding in a diametrical direction the thickness of said wall, a sleeve reciprocable axially of the outer element upon the outer bearing surface and having a slide-confining portion and a cavity, the slide-confining portion and the cavity being respectively registrable with the said slide according to the position of the sleeve, and an inner element telescopically related to the outer element for relative axial movement and provided with a slide-receiving recess in which the slide is normally engaged when the elements are assembled, and means for releasably holding the sleeve in a position in which its slide-confining portion registers with the slide whereby the slide locks the elements together against axial movement, said slide having a rounded head underneath which said shoulders are provided and having a radially innermost end inwardly concave transversely of the coupling and convex axially of the coupling.

3. A coupling according to claim 2 in which the outer end of the slide is beveled, having a high side and a low side, the shoulders being provided by a pin passing through the slide in a chordal direction and off center toward the high side.

4. A coupling element for releasably connecting splined parts against axial displacement, said coupling element comprising a T-shaped slide having overhanging shoulders, a head portion between said shoulders which is arcuately convex in a plane extending from one of said shoulders toward the other and is also arcuately convex transversely of said plane, said slide having an end remote from said head portion, said latter end portion being arcuately concave in said plane and arcuately convex transversely of said plane.

References Cited by the Examiner

UNITED STATES PATENTS

| 1,119,276 | 12/1914 | Griffith et al. | 279—75 |
| 1,541,007 | 6/1925 | Thiemer | 287—535 |
| 2,009,371 | 7/1935 | Junge | 287—535 |
| 2,377,812 | 6/1945 | Scheiwer | 285—316 X |
| 2,413,978 | 1/1947 | Krone | 285—315 X |
| 2,503,495 | 4/1950 | Koester. | |
| 2,860,893 | 11/1958 | Clark | 285—316 X |
| 2,926,020 | 2/1960 | Dayton et al. | 279—75 |
| 2,987,334 | 6/1961 | Wendling | 287—119 |
| 3,043,614 | 7/1962 | Eichmann | 287—119 |
| 3,061,341 | 10/1962 | Grzych. | |
| 3,083,042 | 3/1963 | Collar | 285—314 X |
| 3,179,450 | 4/1965 | Recker. | |

CARL W. TOMLIN, *Primary Examiner.*

I. B. TALTON, C. B. FAGAN, *Assistant Examiners.*